Patented Oct. 14, 1941

2,259,349

UNITED STATES PATENT OFFICE 2,259,349

COMPOSITION FOR COVERING GOLF BALLS

James A. Merrill, Akron, Ohio, assignor to Wingfoot Corporation, Wilmington, Del., a corporation of Delaware No Drawing. Application August 31, 1937, Serial No. 161,799

12 Claims. (Cl. 273—62)

This invention relates to the use of novel and distinctive compositions of matter as golf ball covers. More particularly, it relates to the use as golf ball covers of products prepared by compounding balata or balata-like materials with rubber.

Golf ball covers are often made from balata or balata-like materials to which are added rubber and other compounding ingredients. In some instances, the product so formed is used as a simple blend while in others it is subjected to vulcanization. The rubber is incorporated by adding crude rubber to the balata or balata-like material by processing on a rubber mill or other conventional rubber mixing device. In this method of adding the rubber there is a definite limit to the quantity of rubber which may be incorporated while retaining the desirable properties of the balata and obtaining the proper degree of hardness and resilience in the final product. For several reasons, it is desirable to add to the mix as much rubber as possible at the same time keeping in mind the physical properties desired in the product. Because of the relative costs of balata and rubber, it is economically advantageous to use as as much rubber as possible. This is also true of most of the balata-like materials which may be used in place of balata in golf ball covers. It also seems that the toughness and resilience in the final product is largely due to the rubber present while the hardness is contributed by the balata or balata-like component. Therefore, in order to obtain a material of maximum toughness and resilience, it is desirable to add as much rubber as possible without, however, losing too much of the hardness of the balata or its equivalent.

According to the present invention, large amounts of rubber may be added while retaining the desirable properties of the balata and at the same time adding certain desirable properties to the finished golf ball.

According to the practice of the invention, the rubber is not added by making a simple blend by milling or otherwise mixing crude rubber into the balata or balata-like material, but instead the rubber is prepared in the form of a fine vulcanized soft rubber powder and is then added to the balata or balata-like material. By adding the rubber by this method, the product obtained instead of being a more or less homogeneous blend consists of very fine discrete particles of vulcanized soft rubber dispersed throughout the balata or balata-like material. In such a product the external base of balata lends the desired hardness while the internal phase of discrete rubber particles gives toughness and resilience. It has been found that materials so prepared may be made with much higher rubber contents while obtaining properties suitable in a golf ball cover stock than can be done by the conventional method of blending crude rubber with the balata or balata-like material. At the same time, the cover possesses a greatly improved resilience and is extremely tough and resistant to cutting.

The hardness of the compounds so prepared is considerably greater than would be one made by milling the same amount of crude rubber into balata and curing the mix. Also, if one selects as a desirable hardness that obtained by milling about 40–50 parts of crude rubber into 100 parts of balata by the conventional method and curing the product, that hardness can be obtained according to the present invention while incorporating about 100 parts of cured rubber powder, or approximately twice as much rubber. Since, as previously indicated, the resilience and toughness of the finished stock seem to depend largely on the amount of rubber present, the product prepared according to the present invention is tougher and more resilient than one obtained by the conventional method of milling in crude rubber, each being compounded to give the same hardness.

The cured rubber powder employed may be derived by any means but should be of relatively fine particle size. While it is possible to use products containing larger particles, it will generally be desirable that the powder will completely pass through a 50–60 mesh screen. Best results are obtained when most of the particles are 100 mesh or finer. The finer the particle size of the rubber powder employed, the more nearly homogeneous the mixture may be made. Moreover, in general, by using finer particle size somewhat higher proportions of rubber may be incorporated while obtaining the desired properties.

The rubber powder employed may be any vulcanized soft rubber powder of suitable particle size. Thus, it may be a powder obtained by grinding cured scrap soft rubber. Powder obtained from such a source, however, varies greatly in quality and makes it difficult if not impossible to control the quality of the finished product. A somewhat better method of obtaining the powder, therefore, is by grinding cured soft rubber powder prepared particularly for the purpose according to controlled formulae and conditions. The preferred form of the invention, however, utilizes a rubber powder derived from latex.

Such a powder inherently possesses superior physical qualities since it is prepared without the necessity of breakdown through milling which must occur in the ordinary treatment of crude rubber. Such rubber powders derived from latex are also subject to superior control of particle size. As a result of these and other facts, the products of the invention are particularly outstanding when prepared with a rubber powder derived from latex. Such a powder may be prepared by any of the well known methods of making rubber powders from latex since the present invention is primarily concerned with the utilization of the cured powder regardless of the method by which it is obtained.

The following example is a typical formula in which the practice of the invention proves efficacious.

Formula I

| | Parts by weight |
|---|---|
| Purified balata | 100 |
| Titanium dioxide | 15 |
| 60 mesh cured soft rubber powder derived from latex | 100 |

Such a compound may be prepared by milling the pigment and rubber powder into the balata on a conventional rubber mill. It is a readily moldable, tough, leather-like material and when used as a golf ball cover possesses great toughness and resistance to cutting, very superior resilience, and the proper degree of hardness to give good playing characteristics to the ball.

Instead of the balata of the foregoing example, various other balata-like products may be employed. Materials having physical properties similar to balata and useful as substitutes therefor may be prepared from various condensation derivatives of rubber by proper compounding. Suitable rubber derivatives are prepared by treating rubber with chlorostannic acid, chlorides of amphoteric metals such as tin, iron, aluminum, etc., or various sulfonic acids. One of these derivatives which is very useful is the condensation product derived from rubber by treating it according to U. S. Patent No. 2,052,423 to Sebrell. The following formula demonstrates the practice of the invention when used with such material:

Formula II

| | Parts by weight |
|---|---|
| Chlorostannic acid reaction product of rubber prepared to U. S. 2,052,423 having a softening point of approximately 50° C | 75 |
| Pale crepe rubber | 25 |
| 60 mesh cured soft rubber powder | 30 |

The pale crepe rubber in this formula acts principally as a plasticizer for the rubber condensation product. These two materials are blended on a rubber mill and the rubber powder is then incorporated. The final product is a tough, leather-like material similar to that obtained using balata in Formula I.

Any other balata-like material may also be employed, as for example gutta percha.

Other compounding ingredients may be added to impart the desired characteristics to the mix. Thus, plasticizers, such as uncured rubber, oils, waxes, etc., may be used as may also other modifying materials such as glue, shellac, resins, etc. As shown in Formula I pigments may also be added when desired. These materials, when added, become part of the external phase and serve to modify the properties of the balata-like material. The internal phase consisting of the finely divided cured rubber particles is generally substantially unaffected.

Also, if desired, sulfur or other vulcanizing ingredients, and accelerators may be added. The cover may then be vulcanized during or after the molding operation to give a cover comprising discrete vulcanized soft rubber particles dispersed in vulcanized balata or balata-like material. In general, however, satisfactory results are obtained wtihout this treatment and the product which comprises vulcanized soft rubber powder dispersed in unvulcanized balata or balata-like material constitutes the preferred form of the invention.

While the preferred embodiments of the invention have been described in detail, it will be apparent to those skilled in the art that various modifications may be made without departing from the spirit of the invention or from the scope of the appended claims.

What I claim is:

1. A golf ball having a cover composed of a material comprising an external phase consisting of a material selected from the group consisting of balata, gutta percha and condensation derivatives of rubber and, distributed therethrough, an internal phase consisting of discrete particles of a vulcanized soft rubber powder, substantially all of which powder will pass through a 50-mesh screen.

2. A golf ball having a cover composed of a material comprising an external phase consisting of gutta percha and, distributed therethrough, an internal phase consisting of discrete particles of a vulcanized soft rubber powder, substantially all of which powder will pass through a 50-mesh screen and most of which will pass through a 100-mesh screen.

3. A golf ball having a cover composed of a material comprising an external phase consisting of balata and, distributed therethrough, an internal phase consisting of discrete particles of a vulcanized soft rubber powder, substantially all of which powder will pass through a 50-mesh screen and most of which will pass through a 100-mesh screen.

4. A golf ball having a cover composed of a material comprising an external phase consisting of a condensation derivative of rubber and, distributed therethrough, an internal phase consisting of discrete particles of a vulcanized soft rubber powder, substantially all of which powder will pass through a 50-mesh screen and most of which will pass through a 100-mesh screen.

5. A golf ball having a cover composed of a material comprising an external phase consisting of a material selected from the group consisting of balata, gutta percha and condensation derivatives of rubber and, distributed therethrough, an internal phase consisting of discrete particles of a vulcanized soft rubber powder directly derived from latex, substantially all of which powder will pass through a 50-mesh screen.

6. A golf ball having a cover composed of a material comprising an external phase consisting of gutta percha and, distributed therethrough, an internal phase consisting of discrete particles of a vulcanized soft rubber powder directly derived from latex, substantially all of which powder will pass through a 50-mesh screen and most of which will pass through a 100-mesh screen.

7. A golf ball having a cover composed of a material comprising an external phase consisting of balata and, distributed therethrough, an internal phase consisting of discrete particles of a vulcanized soft rubber powder directly derived from latex, substantially all of which powder will pass through a 50-mesh screen, and most of which will pass through a 100-mesh screen.

8. A golf ball having a cover composed of a material comprising an external phase consisting of a condensation derivative of rubber and, distributed therethrough, an internal phase consisting of discrete particles of a vulcanized soft rubber powder directly derived from latex, substantially all of which powder will pass through a 50-mesh screen, and most of which will pass through a 100-mesh screen.

9. A golf ball having a cover composed of a material comprising an external phase consisting of an unvulcanized material selected from the group consisting of balata, gutta percha and condensation derivatives of rubber and, substantially uniformly distributed therethrough, an internal phase consisting of descrete particles of soft vulcanized rubber powder.

10. A golf ball having a cover of a material comprising an external phase consisting of unvulcanized balata and substantially uniformly distributed therethrough, an internal phase consisting of discrete particles of soft vulcanized rubber powder.

11. A golf ball having a cover of a material comprising an external phase consisting of unvulcanized gutta percha and, substantially uniformly distributed therethrough, an internal phase consisting of discrete particles of soft vulcanized rubber powder.

12. A golf ball having a cover of a material comprising an external phase consisting of an unvulcanized condensation derivative of rubber and, substantially uniformly distributed therethrough, an internal phase consisting of discrete particles of soft vulcanized rubber powder.

JAMES A. MERRILL.